United States Patent [19]

Quilici et al.

[11] 3,710,370
[45] Jan. 9, 1973

[54] WARNING SYSTEM FOR AUTOMOBILE TRAILER HITCHES

[76] Inventors: Alfred P. Quilici, 60 Highland Avenue, Demarest, N.J. 07627; Warren F. Wilson, 70 Dayton Road, Waterford, Conn. 06385

[22] Filed: Nov. 3, 1971

[21] Appl. No.: 195,317

[52] U.S. Cl. ............... 340/27 S, 180/82 R, 200/61.58
[51] Int. Cl. .............................................. G08b 21/00
[58] Field of Search ........... 340/27 S, 52 R, 135, 421; 200/61.58 R, 85; 280/507, 511, 515; 180/82 R, 100, 112

[56] References Cited

UNITED STATES PATENTS 2,797,406   6/1951   Tanis.................................340/282

Primary Examiner—John W. Caldwell
Assistant Examiner—William M. Wannisky
Attorney—Edward F. Levy

[57] ABSTRACT

A warning system for signalling the improper coupling of a trailer hitch to an automobile includes a two-part coupler ball mounted on the rear of the automobile and comprising a fixed portion, an auxiliary portion movably mounted on the fixed portion, and spring means biasing said portions away from each other. Switch means are mounted within the coupler ball and are connected to a signal lamp and buzzer mounted on the automobile dashboard. The auxiliary ball portion is compressed upon the fixed ball portion when the trailer hitch is tightened upon the coupler ball, the ball portions maintaining the switch means in a position to deenergize the signal lamp and buzzer. When the trailer hitch is not properly tightened on the coupler ball, the switch means is actuated to energize the signal lamp and buzzer thereby providing a warning signal to the automobile driver.

10 Claims, 7 Drawing Figures

PATENTED JAN 9 1973
3,710,370
SHEET 1 OF 2
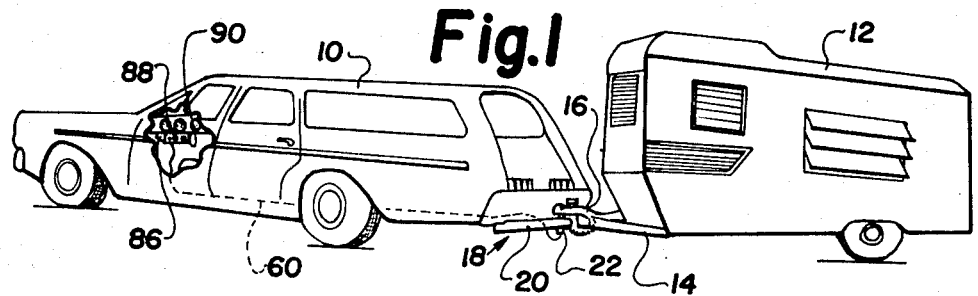
Fig.1
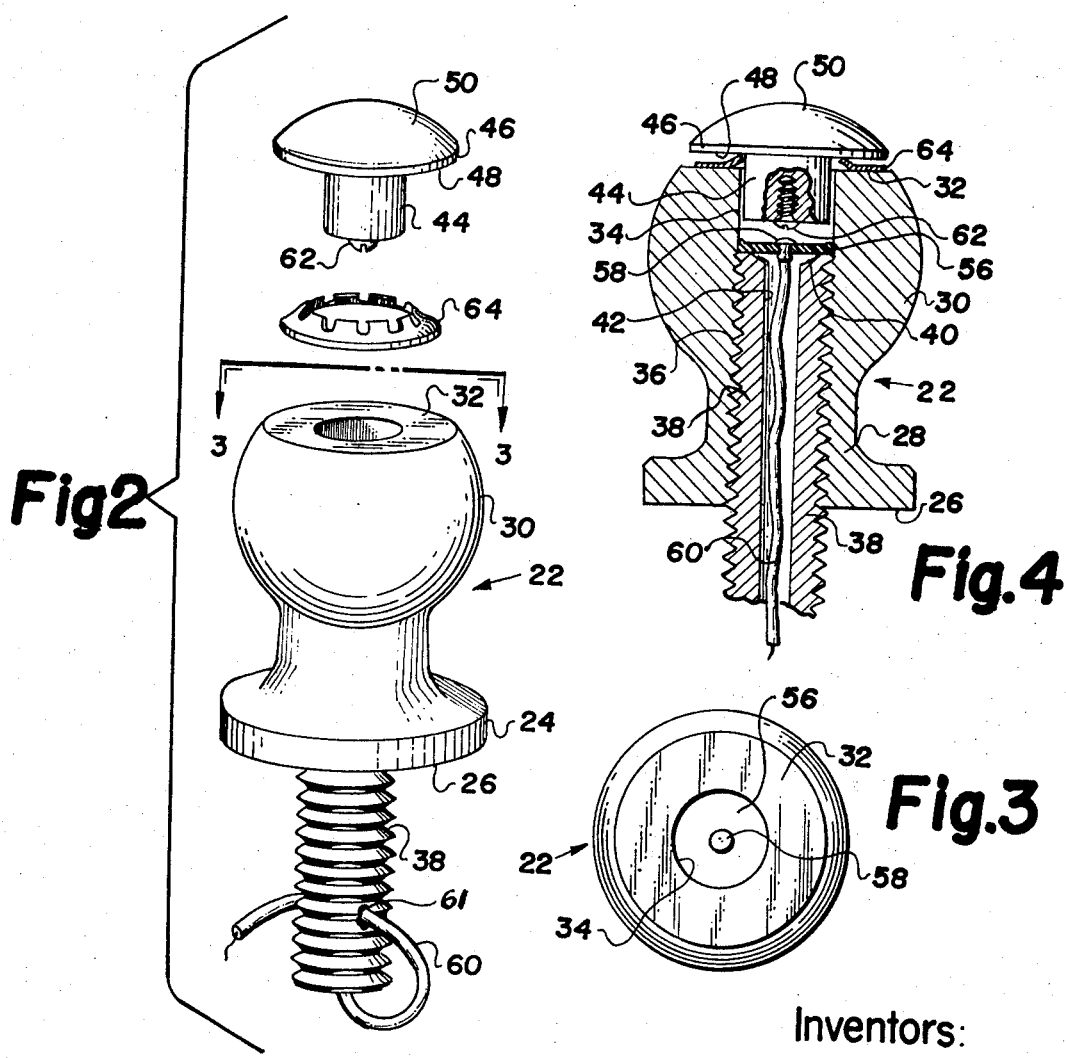
Fig.2
Fig.3
Fig.4
Inventors:
Alfred P. Quilici
Warren F. Wilson
By: Edward F. Levy
Attorney:

Inventors:
Alfred P. Quilici
Warren F. Wilson

By: Edward F. Levy
Attorney:

WARNING SYSTEM FOR AUTOMOBILE TRAILER HITCHES

The present invention relates to improvements in automobile trailer hitches, and in particular to a new and improved warning system which signals the driver of the automobile when the hitch becomes loose or uncoupled.

When a trailer is hitched to the rear of an automobile, the hitch assembly on the trailer is attached to a hitch mount secured to the rear of the automobile and projecting therefrom. The automobile hitch mount normally includes an upstanding metal coupler ball upon which a socket in the trailer hitch is tightened by a screw or other clamping means. The spherical shape of the ball mount provides a pivotal hitch coupling so that the trailer can turn to a limited degree independently of the automobile, and thus the automobile and trailer can be readily maneuvered.

In assembling the trailer to the automobile, the user frequently fails to tighten the screw means with sufficient force to clamp the trailer hitch socket securely to the coupler ball. Further, during travel over rough or hilly terrain, the screw means frequently works itself loose. In either event, when the screw means is untightened, there is a danger that the trailer hitch will uncouple from the automobile hitch mount causing damage to the trailer, or even the loss thereof, while the driver is travelling unaware of this situation.

It is an object of the present invention to provide a warning system for trailer hitches which will produce a signal to the automobile driver when the trailer hitch coupling is sufficiently loose that the trailer is liable to become disconnected.

Another object of the invention is the provision of a warning system for trailer hitches of the character described, which is built into the hitch mount of the automobile and is connected to signal means on the automobile dash board, incorporating a simple electrical circuit which may be quickly and easily installed on any automobile.

Still another object of the invention is the provision of a warning system of the character described in which the coupler ball of the automobile hitch mount serves as the switch for the electrical circuit controlling the signal means, so that when the hitch socket becomes loose on the ball, a signal is immediately given to the driver.

A further object of the invention is the provision of a warning system of the character described in which both an audible and visual signal is given to the driver.

In accordance with the invention herein, there is provided a warning system for automobile trailer hitches which includes a coupler ball sized to receive a trailer hitch secured tightly thereon, the coupler ball having a stationary ball body and a movable body portion mounted thereon. Electrical switch means are interposed between the ball body and the movable body portion and connected within an electrical circuit adapted to energize warning signal means on the dash board of the automobile to which the trailer is hitched. The switch means is operative to deenergize the warning signal means as long as the trailer hitch is secured tightly to the coupler ball and to energize the warning signal means when the trailer hitch loosens on the coupler ball.

Additional objects and advantages of the invention will become apparent during the course of the following specification when taken in connection with the accompanying drawings, in which:

FIG. 1 is a perspective view of an automobile with a trailer hitched thereto, the automobile hitch mount and dashboard incorporating the warning system of the present invention;

FIG. 2 is an exploded perspective view showing the coupler ball of the automobile hitch mount;

FIG. 3 is a top plan view of the lower portion of the coupler ball, as viewed along line 3—3 of FIG. 2.

FIG. 4 is a central vertical section through the coupler ball, the latter being shown in switch-open position;

Figure 5:
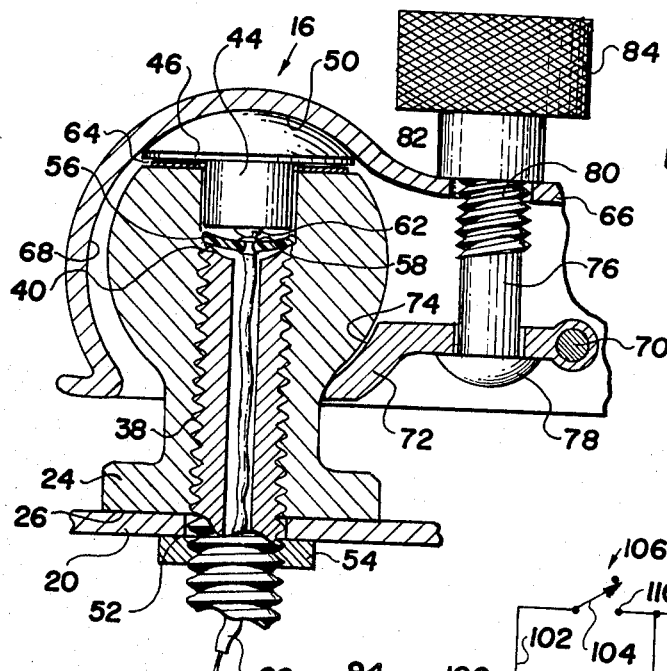
FIG. 5 is a sectional view showing the trailer hitch socket secured to the coupler ball and holding the same in switch-closed position.

Referring in detail to the drawings, there is shown in FIG. 1 an automobile 10 to which a trailer 12 is hitched. The trailer 12 is provided at its front end with the conventional and well-known hitch assembly including a triangular frame 14 upon which a ball socket member 16 is mounted. Secured to the rear of the automobile 10 is a hitch mount 18 comprising a plate 20 which projects from the rear end of the automobile and carries a coupler ball member 22.

The coupler ball member 22 is shown in detail in FIGS. 2-4 as differing from the conventional one-piece solid ball in that it is formed of two pieces in order to serve as the switch means for the warning system of the invention. The ball member 22 includes an integrally formed lower section comprising a circular base 24 having a flat bottom surface 26, a neck 28 upstanding on the base, and a spherical section 30, the upper portion of which has been cut off to present a flat top surface 32. Extending centrally through the lower section is a through longitudinal bore having an upper bore section 34 and a lower bore section 36 which is internally threaded to receive an externally threaded mounting post 38. As shown in FIG. 4, the upper bore section 34 has a smooth, unthreaded wall, and the threaded post 38 is turned through the threaded lower bore section 36 until it reaches the upper bore section 34, and is secured tightly in this mounted position.

The threaded post 38 has a concavity 40 formed centrally in its upper surface, and a central longitudinal through bore 42 which communicates with the interior of the upper bore section 34 through said concavity 40.

The ball member 22 also includes an upper section comprising a unitary member having a cylindrical stem 44 terminating at its upper end in an enlarged circular flange 46 having a flat bottom surface 48 and an arcuate top surface 50. The cylindrical stem 44 is sized to fit slidably within the upper bore section 34 of spherical section 30, so as to mount the flange 46 is overlying relationship upon said section 30. It will be seen in FIGS. 2 and 4 that the flange 46 is in the shape of a segment of a sphere, and when it overlies the spherical section 30, these two elements combine to form an entire spherical ball.

The portion of the threaded post 38, which projects below the circular base 24, is utilized to mount the coupler ball member 22 on the automobile 10. As shown in FIG. 5, the post 38 is inserted through an aperture 52 in the hitch mount plate 20, until the flat bottom surface 26 of the base 24 rests upon the upper surface of plate 20, and is held securely in this mounted position by a nut 54. The plate 20 is made of electrically conductive metal and is secured to the chassis of the automobile 10, and the coupler ball member 22 as well as the movable upper section thereof are also made of conductive material, so that the ball assembly is electrically grounded and thus capable of serving as a switch contact in the electrical circuit to be presently described.

The coupler ball member 22 is provided with electrical switch elements which include a circular disc 56 of insulating material, at the center of which is secured an electrical contact member 58. The disc 56 is made of a somewhat flexible material, such as printed circuit board, and fits snugly at the bottom of the upper bore section 34 with the contact member 58 facing upwardly, as shown in FIG. 5. An insulated lead wire 60 is connected to the contact member 58 and extends downwardly through the bore 42, and then through aligned apertures 61 in the wall of post 38, the lead wire 60 then extending to the interior of the automobile 10.

The upper ball section serves as the movable switch element, and for this purpose, an electrical contact member 62 is mounted at the center of the bottom surface of the cylindrical stem 44 in alignment with the contact member 58. The contact member 62 may be an electrically conductive screw, as shown in FIG. 5.

The contact members 58 and 62 are normally maintained in the spaced, switch-open position of FIG. 4 by a slotted, convex spring washer 64 which is interposed between the flat bottom surface 48 of the enlarged circular flange 46, and the flat top surface 32 of the spherical section 30. The spring washer 64 is made of electrically conductive, flexible metal, and serves as a further electrical connection between the upper and lower sections of ball member 22.

FIG. 5 shows in detail the construction of the conventional ball socket member 16 which is mounted on the triangular frame 14 of the trailer hitch assembly. The socket member 16 includes a channel-shaped arm 66, the forward end of which is formed with a generally spherical cavity 68 sized to receive the upper and lower ball sections of ball member 22. Mounted by pivot 70 within the channel of arm 66 is a bracket 72 having an arcuate forward surface 74. A bolt 76 extends through the bracket 72 and has an enlarged head 78 underlying said bracket 27 and a threaded upper end 80 which extends through an aperture 82 in the top wall of arm 66. A nut 84 is mounted on the threaded upper end 80 of bolt 76, and overlies the top wall of arm 66, the nut 84 being manually turnable to raise the bolt 76 and thus to pivot the bracket 72 upwardly so that its arcuate surface 74 presses upwardly on the lower surface of the spherical section 30. In this manner, the spherical sections of ball member 22 is tightly clamped within the socket 68 of the arm 66.

When the hitch assembly of the trailer is initially mounted over the coupler ball member 22, and before the clamping nut 84 is tightened, spring washer 64 maintains switch contacts 58 and 62 spaced apart in the switch-open position of FIG. 4.

Trailers of the type shown in FIG. 1 are usually front-weighted so that there is always at least ten to fifteen percent of the total trailer weight exerted by the top wall of arm 66 as a downward force upon the upper ball section of coupler ball member 22. The spring washer 64 is made of sufficient rigidity to bear the trailer weight without flexing, but to flex when additional downward pressure is exerted upon the upper ball section as the clamping nut 84 is tightened. Thus, when the nut 84 is tightened sufficiently to clamp the ball member 22 firmly within the socket cavity 68, the cylindrical stem 44 of the upper ball section is pressed downwardly within the upper bore section 34 against the tension of spring washer 64 which flattens out in the manner shown in FIG. 5. This downward movement of stem 44 brings contact 62 into engagement with contact 58, thus closing the switch provided within the ball member, and connecting the lead wire 60 to ground through the body of ball member 22 and the plate 20 upon which it is mounted.

When the contact 62 is brought into engagement with contact 58, the circular disc 56 which carries contact 58 is flexed or bowed downwardly, as shown in FIG. 5, and the contacts 58 and 62 are held in firm engagement under tension. The concavity 40 formed in the upper surface of post 38, permits such downward flexing of the disc 56.

Figure 6:
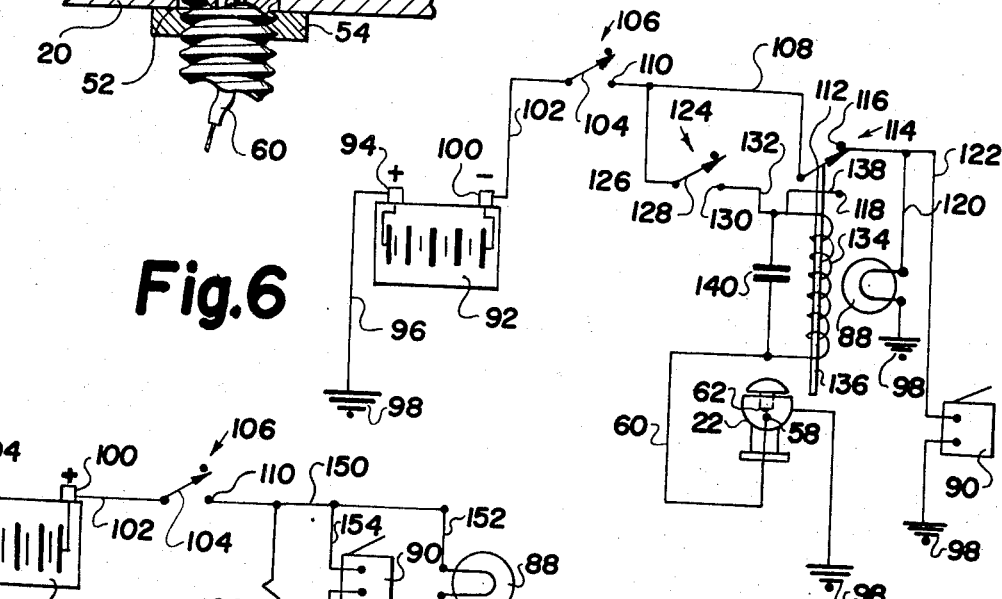
FIG. 6 is a schematic diagram of the circuit for the warning system.

FIG. 6 shows schematically one form of electrical circuit which may be utilized in the warning system of the present invention. The components of this electrical circuit are housed within a panel or box 86 mounted on the dashboard of the automobile 10, upon which panel or box 86 is mounted an electric signal light 88 as well as an audible signal device 90 such as an electric buzzer, horn or the like. As indicated in FIG. 1, the lead wire 60 extends from the coupler ball member 22 through or under the automobile 10 to the electrical circuit contained in the box or panel 86 on the automobile dashboard.

The schematic circuit diagram of FIG. 6 shows the automobile battery 92, the terminal 94 of which is connected by lead 96 to ground 98, which in this instance is the chassis of automobile 10. The other battery terminal 100 is connected by lead 102 to the movable contact arm 104 of an on-off switch 106 which is mounted on the dashboard panel or box 86 (FIG. 1), and which is preferably a toggle switch. A lead 108 connects the contact 110 of switch 106 to the movable arm 112 of a single-pole, double-throw switch 114 having contacts 116 and 118. The arm 112 is normally biased to the position shown in FIG. 6, in which it engages contact 116. The aforementioned signal light 88 and buzzer 90 connected in parallel by respective leads 120 and 122 between the switch contact 116 and ground 98.

The circuit of FIG. 6 also includes a push-button switch 124 which is also mounted on the outside of dashboard panel or box 86 where it is accessible to the driver. The switch 124 is normally biased to the open position shown in FIG. 6. A lead 126 connects the lead 108 to the movable contact arm 128 of switch 124. The fixed contact 130 of switch 124 is connected by lead 132 to one end of a solenoid coil 134, the other end of which is connected to the contact 58 within the coupler ball member 22 by the lead wire 60, as also shown in detail in FIG. 5. As previously indicated, the body of both upper and lower sections of ball member 22 is connected to ground 98.

The solenoid coil 134 controls movement of a solenoid armature 136 which is physically coupled to the contact arm 112 of switch 114. The contact 118 of switch 114 is connected by lead 138 to the lead 132. A capacitor 140 may be connected in parallel to the solenoid coil 134 to absorb current spikes.

In operation of the warning system, after the trailer socket member 16 has been coupled to the ball member 22 in the manner previously described, and the driver is ready to start the automobile 10, he manually closes the on-off switch 106, thereby connecting the battery terminal 100 to the movable contact arm 112 of switch 114. Since the arm 112 is biased into engagement with contact 116, the circuit is completed through leads 120, 122 to ground, illuminating the signal light 88 and sounding buzzer 90. This initial signal assures the driver that both the audible and visual warning devices are operating properly.

The driver then depresses and releases the push-button switch 124 which has the effect of energizing the solenoid coil 134 only if the switch means within the coupler ball member 22 is closed. Thus, if the trailer socket member is not tightened with sufficient force on the coupler ball so that the switch contacts 58 and 62 are in firm engagement, the connection of lead 60 to ground is left open, and depression of the push-button switch 124 will have no effect on the warning signals. The signal light 88 and buzzer 90 will continue to be energized and the driver is advised that he must tighten the trailer hitch assembly before proceeding.

If, on the other hand, the trailer hitch assembly is properly tightened when the driver depresses the push-button switch 124, the circuit is completed to ground 98 through lead 126, switch contact 130, lead 132, solenoid coil 134, lead 60, switch contacts 58, 62 the body of ball member 22. The solenoid coil 134 is thus energized, drawing solenoid armature 136 inwardly, and moving contact arm 112 of switch 114 out of engagement with contact 116 and into engagement with contact 118. This not only interrupts the energizing circuit to the signal devices 88 and 90, it also closes a holding circuit through solenoid coil 134. This holding circuit is completed from lead 108 through switch arm 112 and contact 118, and lead 138 through solenoid coil 134 to continue to energize the latter when push button switch 128 is released and opens. Thus, after the push-button switch 128 is released to its open position, the arm 112 of switch 114 remains in engagement with contact 118 and out of engagement with contact 116, so that the signal devices 88 and 90 are deenergized.

If the trailer hitch socket 16 should work loose upon the ball member 22 or become disassembled therefrom while the automobile 10 is hauling the trailer 12, the driver of the automobile is given an immediate audible and visible signal loosening of the socket member 16 results in the spring washer 64 elevating the upper ball section, thereby separating the switch contacts 58 and 62 and disconnecting lead 60 from ground. The energizing circuit for solenoid coil 134 is thus broken, and the deenergized coil releases the solenoid armature 136, permitting contact arm 112 of switch 114 to be biased from contact 118 into engagement with contact 116. This completes the energizing circuit for signal light 88 and buzzer 90, and the driver is thus advised of the danger of losing the trailer. To discontinue both signals, the driver must open the on-off switch 106, and he may then stop the automobile and attend to retightening the trailer hitch coupling. After reentering the automobile, the driver again closes on-off switch 106 to obtain the warning signals and then depresses the contact arm of push-button switch 124, and the deenergization of the warning signal devices 88 and 90 informs the driver that the trailer hitch is safely secured.

Figure 7:
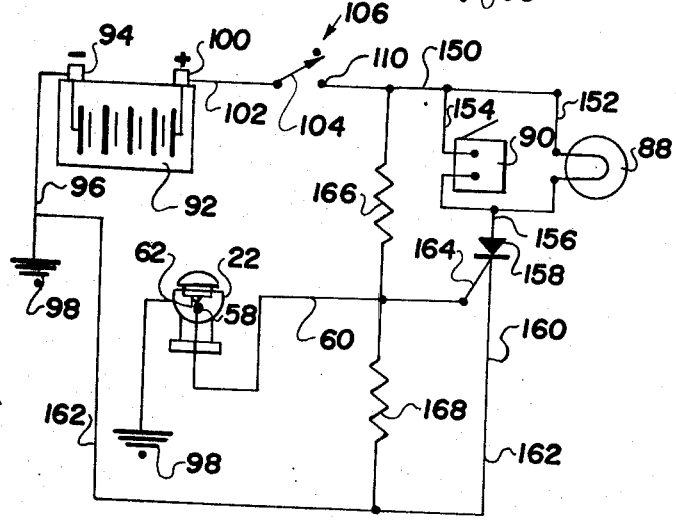
FIG. 7 is a schematic diagram for an alternative form of circuit for the warning system.

FIG. 7 illustrates an alternate form of circuit which may be utilized in the warning system of the invention, and in which the push-button switch and solenoid are eliminated and replaced by a single silicon controlled rectifier. The terminal 100 of the automobile battery 92 is again connected by lead 102 to the movable contact arm 104 of on-off switch 106. The switch contact 110 is connected to lead 150, and the signal light 88 and buzzer 90 are connected in parallel by respective leads 152 and 154 between said lead 150 and the anode 156 of an SCR (silicon controlled rectifier) 158. The cathode 160 of SCR 158 is connected by lead 162 to ground 98, and the gate electrode 164 is connected to lead 60 which, as previously described, is connected to contact 58 located within the grounded ball member 22. A resistor 166 is connected between the leads 60 and 150, and a second resistor 168 is connected between leads 160 and 162, these resistors 166 and 168 serving as voltage dividers for the battery voltage to provide a selected voltage for the SCR gate. 164.

In operation of the circuit of FIG. 7, if the trailer hitch is tightly coupled so that the ball member switch contacts 58 and 62 are in firm engagement, when the on-off switch 106 on the dashboard panel is closed, a circuit is completed from battery terminal 100 through resistor 166, lead 60, the closed contacts 58 and 62 and the body of ball member 22 to ground 98. This circuit by-passes the signal devices 88 and 90, which are deenergized, and the absence of a warning signal assures the driver that the trailer hitch is properly coupled.

If the trailer hitch coupling should loosen to permit the ball member switch contacts 58 and 62 to separate, the aforementioned circuit is not opened, and current flows from lead 150 through both resistors 166 and 168 to ground 98 via lead 162. The resistors 166 and 168 provide gate voltage to the SCR 158, triggering the latter to conduct current. A circuit is thus completed from lead 150 through both signal devices 88 and 90 and through the SCR 158 to ground via lead 162. The energized signal devices 88 and 90 provide simultaneous visual and audible warning signals to the driver of the automobile, which will continue until the trailer hitch coupling is properly tightened.

As previously described, the lead wire 60 extends along the automobile chassis from the coupler ball member 22 to the electrical circuit in the dashboard panel or box 86. When employed with either of the circuits shown in FIGS. 6 and 7, if this wire 60 should become broken or disconnected, the signal devices 88 and 90 will become energized to warn the driver of this situation. In this regard, it will be noted in FIG. 2 that the lead wire 60, after leaving the mounting post 38 through the bottom thereof, is threaded through aligned apertures 61 so that it passes transversely through the interior of the post 38 at a point located beneath the nut 54 (shown in FIG. 5). Thus, if the nut 54 loosens and begins to work itself down the threaded post 38, it cannot separate from the post without first cutting the lead wire 60. As soon as the lead wire 60 is cut in this manner, an immediate warning signal is given to the driver, advising him that the nut has worked loose and the coupler ball member 22 is in danger of disengaging from the mounting plate 20.

While preferred embodiments of the invention have been shown and described herein, it will be appreciated that numerous ommissions, changes and additions may be made in such embodiments without departing from the spirit and scope of the invention.

What is claimed is:

1. For use with a trailer hitch having a socket member adapted to be secured tightly on a coupling member mounted on an automobile, an electrically-operated warning system for signalling a loose coupling of said socket member on said coupling member, said warning system including said coupling member, electrical signal means, and an electrical circuit operative to selectively connect said signal means to an electrical power source for energization of said signal means, said coupling member comprising a main body portion, means for rigidly mounting said main body portion of the rear end of said automobile, an auxiliary body portion movably mounted on said main body portion, electrical contacts mounted respectively on said auxiliary body portion and main body portion in confronting relationship, spring means biasing said auxiliary body portion away from said main body portion to an extended position in which said electrical contacts are separated, said auxiliary body portion being movable toward said main body portion to a compressed position in which said electrical contacts are in engagement in response to tightening of said trailer hitch on said coupling member, said electrical contacts constituting switch means in said electrical circuit for energizing said signal means when said contacts are separated, and deenergizing said signal means when said contacts are in engagement.

2. A warning system according to claim 1 in which said coupling member main body portion is a sphere having a cut-away section providing a flat surface and a bore extending inwardly from said flat surface, and in which said auxiliary body portion has a first section shaped as a segment of a sphere and a second cylindrical section sized to fit slidably within said bore with said first section overlying the flat surface thereof and forming with said main body portion a completed sphere.

3. A warning system according to claim 2 in which said spring means is a spring washer mounted on said cylindrical section between the flat surface of said main body portion and the first section of said auxiliary body portion.

4. A warning system according to claim 2 in which said electrical contacts comprise a first contact mounted on the free end of the cylindrical section of said auxiliary body portion and a second contact mounted within the bore of said main body portion and electrically insulated from the body thereof.

5. A warning system according to claim 4 in which the main body portion and auxiliary body portion of said coupling member are made of electrically conductive material and in which an electrically conductive member mounts said main body portion on a grounded chassis portion of said automobile.

6. A warning system according to claim 5 in which said signal means includes a signal lamp and a sound device mounted on the dashboard of said automobile, and in which an insulated lead wire is connected to said second contact and extends through the main body portion of said coupling member to the signal means on said automobile dashboard.

7. A warning system according to claim 6 in which said electrical circuit includes a first circuit portion connecting said electrical power source to said signal means, and a second circuit portion by-passing said first circuit portion, said electrical contacts being connected in series with said second circuit portion for completing the latter and interrupting the first circuit portion when said contacts are in engagement.

8. A warning system according to claim 7 in which said electrical circuit includes switching means in series with said power source and said signal means, said switching means being operative to complete a current path from said power source through said signal means to ground in response to separation of said electrical contacts from each other, said switching means being also operative to interrupt said current path in response to engagement of said electrical contacts with each other.

9. A warning system according to claim 8 in which said switching means includes a solenoid having a coil and an armature, and a switch mechanically coupled to said armature, said switch having a first fixed contact connected to said signal devices and a second fixed contact connected to one end of said coil, the other end of said coil being connected through said insulated lead wire to the second contact of said coupling member.

10. A warning system according to claim 8 in which said switching means comprises an SCR having its cathode and anode terminals connected between said signal devices and ground, and its gate electrode connected through said insulated lead wire to the second contact of said coupling member.

* * * * *